United States Patent Office 3,063,827
Patented Nov. 13, 1962

3,063,827
SLAG-LINED FURNACE TAPPING POTS
Russell D. Fox, Belpre, Ohio, assignor to Union Carbide Corporation, a corporation of New York
No Drawing. Filed Feb. 20, 1959, Ser. No. 794,495
2 Claims. (Cl. 75—61)

This invention relates to a method for lining furnace tapping pots and, more particularly, to a method for lining furnace tapping pots with material itself a product of the furnace reactions.

When a furnace operation is completed, removal of the molten metals from the furnace is accomplished by positioning a ladle or furnace tapping pot under a plugged hole in the furnace and tapping the furnace so that the molten charge pours into the pot. When the plug is removed and the molten metal flows out of the furnace into the tapping pot, the tapping pot is subjected to the same intense heat of the molten metal as existed in the furnace. The tapping pot must therefore be protected from this intense heat by a suitable lining just as the walls of the furnace itself are protected by a refractory lining.

These furnace tapping pots are generally constructed of plain cast iron or other materials and are found in a wide variety of shapes and sizes. In ferrous-metal production a round 50-cubic foot tapping pot that is fabricated from plain cast iron sections is frequently used. These tapping pots usually have a cast iron insert in the bottom, in the center of which a retap core is inserted to facilitate retaping. This retap core is usually plugged with clay. The molten metal is discharged from a tapping pot by piercing the core at the bottom after having positioned the tapping pot over molds or other metal receiving vessels and allowing the molten metal to pour out of the tapping pot.

The customary method of lining these tapping pots comprises applying a lining of insulating refractory material over the inner surfaces of the taping pot. Of the many refractory materials that can be applied to protect the surfaces of tapping pots, a simple mud lining is often used. The mud lining is applied by hand, as are most other refractory linings, and must be thoroughly dried lest the molten metal come in contact with any moisture in the lining and cause an explosive evolution of steam. These linings are often dried by heat generated by the burning of gas or oil. Despite the cheapness of the materials used in a mud lining (sand and clay), the labor and time consuming nature of the operation, plus the need for drying the lining, and the danger of a steam explosion, have left the industry with an expensive and heretofore unavoidable operation.

It is the primary object of this invention, therefore, to provide an improved method of tapping furnaces that provides protection to the tapping pots against the intense heat of the molten metal, and which involves a minimum of manual labor with greater safety for the operator, and which may be accomplished in a fraction of the time presently employed in this operation.

It is a further object of this invention to provide protection to furnace tapping pots during a furnace tapping operation with a lining material that is a product of the furnace operation itself and consequently inert to the molten metal and that does not contain any moisture.

Other aims and advantages of the invention will be apparent from the following description and the appended claims.

In accordance with the present invention, a process for tapping a furnace comprises the steps of positioning an unlined furnace tapping pot underneath the slag pouring spout of a furnace or slag-containing vessel, and tapping the furnace or slag vessel so that the slag pours into the tapping pot, filling it to the desired level, holding the slag in the pot for a sufficient time for a peripheral portion of the mass of slag to harden on the adjacent inner walls of the pot forming a continuous insulating layer of slag over the inner walls of the pot, emptying the pot of excess slag, and using the slag-lined pot to receive molten metal from the furnace or other furnaces.

In practice the time the hot slag is left standing in the unlined tapping pot is determined by the time required for a layer of the hot slag to harden on the relatively cooler walls of the tapping pot; the slag being kept in the pot for a time sufficient for a layer of the desired thickness, on the order of 2 inches, to solidify on the walls of the tapping pot.

In operation the process of this invention may be practiced by preparing a 50-cubic foot unlined pot of cast-iron construction to receive a ferrochromium heat. This generally includes placing a retap core, made from crushed chrome slag and silicia flour, in position in the retap hole of the tapping pot and then covering the core with a pad of clay, thus sealing the retap hole. This unlined pot is then placed under the slag pouring spout of a furnace of slag-containing ladle. The slag from the furnace or ladle is tapped and allowed to run from the pouring spout into the unlined pot. After the pot is filled with slag, the hot slag mass is allowed to set in the tapping pot until a layer of slag on the order of 2 inches in thickness solidifies on the relatively cooler walls of the tapping pot. This usually takes about 15 minutes, after which time the excess slag is removed from the pot, for example, by pouring it into another vessel leaving the tapping pot lined with an insulating layer of slag. This slag-lined pot is now ready to receive the molten metal from the same furnace or another furnace and the molten metal can be tapped into the slag-lined pot in the same manner and with the same satisfactory results as obtained when a mud-lined pot is used.

The method of this invention may be used in any furnacing operation in which a slag is produced. The use of a furnace slag as a protective liner for the metal produced in the furnace is very efficient because the slag is composed of oxides and other forms of the same elements in the furnace metal and so there is no danger of chemical reaction between the two.

In another example of the practice of this invention two pots were used—one lined with mud in the conventional manner and an unlined pot—to receive a ferrochrome heat. The mud-lined pot was placed under the pouring spout of the furnace and the unlined pot was then placed under the lip of the lined pot so that overflow from the mud-lined pot would pour into the unlined pot. When the furnace was tapped, the slag and metal were allowed to run from the furnace pouring spout into the mud-lined pot. The molten metal, being heavier than the slag, remained at the bottom of the mud-lined pot while the lighter slag overflowed into the plain, unlined pot. The rate of flow should be regulated to permit this separation. After the run was complete and the furnace was plugged, the metal pot and then the slag pot were emptied of slag. The slag had been in the tapping pot for about 15 minutes after the plugging of the furnace and a slag shell approximately 2 inches thick had been formed in the tapping pot. This slag-lined pot was then used as a metal pot on the following furnace tap. The furnace was subsequently tapped in the same manner as previously described except that the slag-lined pot was used to receive the molten metal. The retapping of the furnace was highly successful, the slag lining performing equally well as the mud lining of the first pot. Whereas the manual lining of a tapping pot with mud would require the services of several men for an hour or more, the slag-lining method of this operation allowed the satisfactory completion of this operation in about 15 minutes, without the need for additional personnel. Furthermore, there was no need to dry the lining and there was no danger of explosion.

In another instance a slag from a high-carbon ferrochrome heat was employed as a lining for a pot which was to receive a siliconmanganese and ferrochrome heat. There were no adverse effects on the molten metal tapped into this pot. While a slag lining obtained from the same type furnacing operation that produced the metal being poured is preferable, any slag which will not react with the metal or alloy being poured is suitable.

It is to be noted that many variations of this method of tapping furnaces into tapping pots lined with slag may be employed. However, it is not intended to limit the present invention to the precise method used in the given examples of the practice of the invention. Various shapes and sizes of tapping pots may be given a protective coating of slag in other manners and still be within the scope of this invention.

Two or more tapping pots may be lined in the same operation by back-pouring the slag from one tapping pot to another until all have a protective lining, the thickness of the lining being determined by the time lapse between back-pourings.

Again several tapping pots may be put in a step-like series so that the slag may be poured continuously into the highest pot and allowed to overflow, cascade fashion, into subsequent pots. After a time lapse sufficient for a slag lining to form in each pot, the pots may be emptied of surplus slag and held for future use.

What is claimed is:
1. In a method for tapping furnaces wherein the molten metal charge of the furnace is to be poured into a furnace tapping pot, the improvement which comprises positioning a protectively-lined tapping pot under the pouring spout of said furnace, positioning an unlined tapping pot adjacent to the protectively-lined pot to receive the overflow therefrom; tapping the furnace and delivering the mixture of slag and metal flowing therefrom into the protectively-lined pot at a rate such that the lighter slag rises to the top of the pot, continuing to deliver such mixture until the slag overflows the protectively-lined pot and flows into the unlined tapping pot; holding the slag in the pot for a sufficient time for the portion of the mass of slag that is contiguous with the adjacent inner walls of the pot to solidify on said inner walls; emptying the pot of the excess slag to leave a slag-lined tapping pot, and thereafter pouring molten metal from a furnace, said molten metal being chemically nonreactive with said slag, into said so-lined tapping pot.

2. A method for tapping furnaces as claimed in claim 1 wherein the molten metal is poured from the same furnace into the slag-lined tapping pot.

References Cited in the file of this patent

UNITED STATES PATENTS

| | | |
|---|---|---|
| 618,256 | Shook et al. | Jan. 24, 1899 |
| 1,590,739 | Evans | June 29, 1926 |
| 2,493,394 | Dunn et al. | Jan. 3, 1950 |